Figure 1:
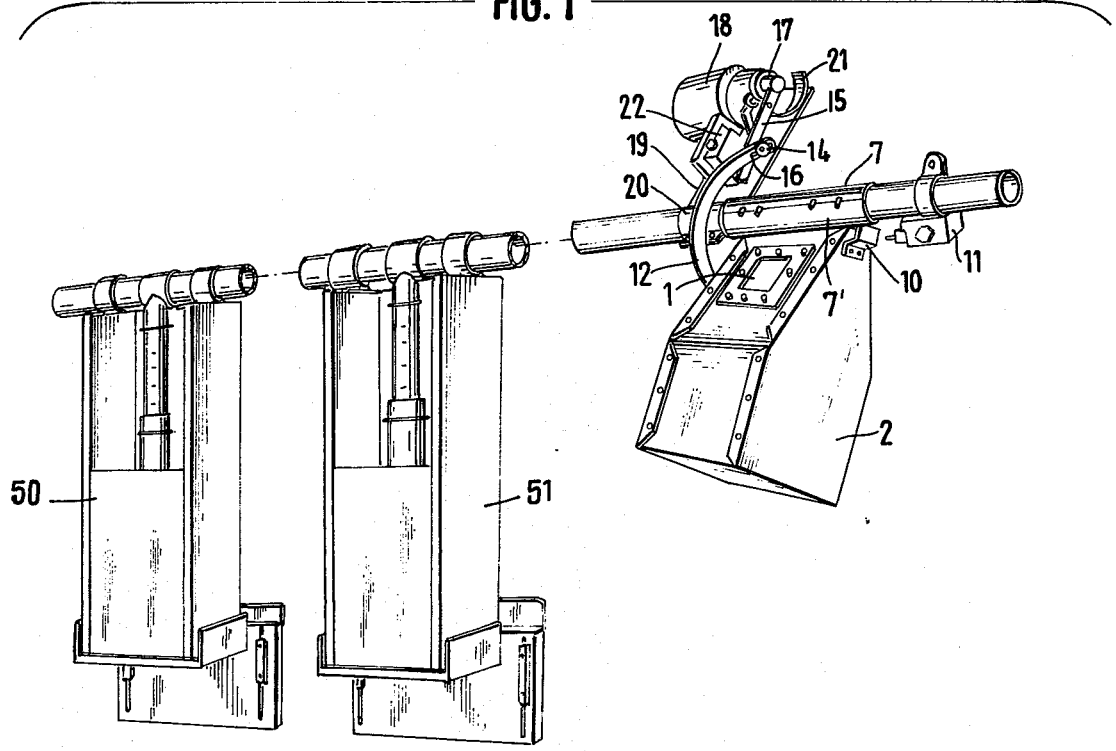

United States Patent [19]

Jørgensen

[11] 4,175,596
[45] Nov. 27, 1979

[54] STOP DEVICE TO BE USED IN AUTOMATIC FEEDING SYSTEMS

[75] Inventor: Niels Jørgensen, Herning, Denmark

[73] Assignee: Aktieselskabet Funki Maskinfabrik, Herning, Denmark

[21] Appl. No.: 871,461

[22] Filed: Jan. 23, 1978

[30] Foreign Application Priority Data

Dec. 1, 1977 [DK] Denmark ............................ 103/77

[51] Int. Cl.² .................... B65B 3/28; A01K 5/02
[52] U.S. Cl. ................... 141/18; 119/52 AF;
 141/67; 141/83; 141/192; 141/377; 222/77
[58] Field of Search ................ 141/67, 68, 113, 131,
 141/164, 168, 171, 198, 271–274, 281, 377, 114,
 18, 83, 192, 196, 277; 302/59; 222/77, 70;
 119/52 AF, 56 R, 57

[56] References Cited

U.S. PATENT DOCUMENTS

| | | | |
|---|---|---|---|
| 3,394,681 | 7/1968 | Rigterink et al. | 119/52 AF |
| 3,908,601 | 9/1975 | Geary | 119/52 AF |
| 3,995,408 | 12/1976 | Guenther | 141/114 X |

Primary Examiner—Richard E. Aegerter
Assistant Examiner—Frederick R. Schmidt
Attorney, Agent, or Firm—Edward F. Levy

[57] ABSTRACT

The present invention is a stop device to be used in automatic feeding systems consisting of a number of feed dispensers placed in succession and combined with a pipe-shaped transport string (conveyor tube) in which the feed is conveyed by an endless feed mechanism, e.g. a scraper chain or a steel wire with scraping units, so that the feed dispensers are filled successively. The stop unit is mainly placed after the last feed dispenser.

14 Claims, 6 Drawing Figures

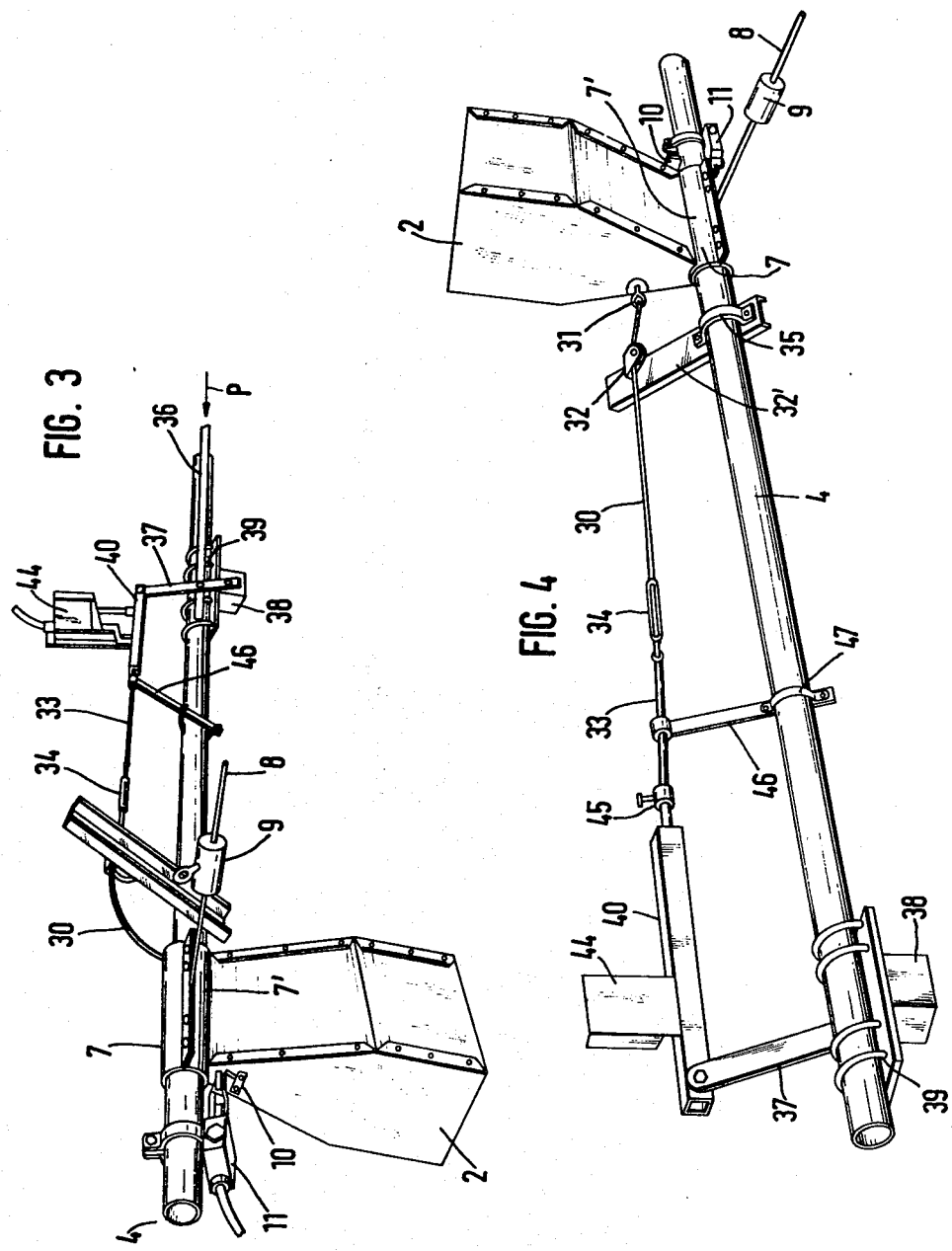

STOP DEVICE TO BE USED IN AUTOMATIC FEEDING SYSTEMS

There exists an automatic stop unit used in feeding systems where feed is conveyed through a conveyor tube by a rotating worm or spiral and which is activated by accumulation of feed in the tube.

The accumulation is produced by cutting off some parts of the turns of the worm, e.g. two complete turns, so that the conveyed feed is pressed past this section with a resulting accumulation that actuates a relay by means of an activating arm placed where the cut of the turns has been made.

Conveyance of feed in a conveyor tube takes place in two different ways dependent on whether a rotating worm or a scraping chain drawn through the tube is used.

When using rotating worms for the conveyance there will be so much agitation in the feed that it will be possible to have only one feed dispenser filled at a time.

When using a scraping chain more feed dispensers will be filled at the same time. From a point where the tube is full the degree of filling in the tube will deminish according to an emptying graph in the rotation direction of the chain, the graph having jumps at the points where the feed dispensers are being filled. For instance four feed dispensers might be filled at the same time. Concurrently with the filling of the feed dispensers the emptying graph is shifted in the longitudinal direction of the tube, but the number of simultaneously filled dispensers will be constant until all dispensers are filled.

As a scraping chain can not produce accumulation of feed in the tube the above mentioned stop device can not be used in connection with that type of conveyor.

Furthermore, if an accumulation could be produced by use of a scraping chain the stop device should be placed in such a distance from the last feed dispenser that the front point of the emptying graph does not reach the stop device until the last feed dispenser is filled, otherwise the whole system will be stopped at the wrong moment.

It has, therefore, been necessary to use a different kind of stop device in connection with feed dispensers with scraping chains. Such a known stop device is mounted after the last feed dispenser with inlet from the conveyor tube. The device consists of a container which is spring-loaded suspended in a switch for the motor for the conveyor tube and is thus constructed that when being filled with feed it actuates the switch to stop the conveyor mechanism. The bottom of the container can be opened for discharge and for this purpose the container is fitted with a closing mechanism which can be activated and which is balanced so that it closes when the container is empty.

This stop device has, however, the disadvantage that it requires either manual operation in order to carry back the released feed quantity to the feeding system or a system where the return tube is led up over the feed silo so that the feed can be discharged into the silo. However, this is only possible in high buildings. If the stop device is not placed directly after the last feed dispenser the problem will arise that the feed in the tube between the last feed dispenser and the stop unit will stop operations at the wrong moment. Therefore to make sure that the return tube is emptied it is necessary to adjust the equipment to operate in a pre-determined period. At the same time the stop device should be made ready to stop operations by releasing the feed quantity accumulated in the system by emptying the return tube. Also this stop device is inadequate as no construction is known yet to give the desired safety for the closing of the bottom.

The idea of this invention is to make a dependable stop device in connection with endless conveying mechanisms where the feed quantity for activation of the device is returned to the conveyor tube.

According to the invention this is made possible here, because the stop device consists of a container with inlet from the conveyor tube for detection of a feed quantity for actuation of a contact mechanism to stop the conveying mechanism in the feeding system, which container can be in at least two different positions, namely a stop position where the detected feed quantity actuates the contact mechanism and a release position with recircuit to the conveyor tube, and the device must also include a driving gear for the purpose of at least moving the container from stop position to release position, in which position the container must remain for a certain time during operation of the conveying mechanism.

The just mentioned stop device is constructed for fully automatic operations and is a closed system where the feed returns to the conveyor tube. The unit is independent of the lay-out of the conveyor tube and the conveying mechanism used and can be put up wheresoever wanted, mainly after the last feed dispenser, so that the transportation of the feed stops right after the filling of the dispenser.

Detection of the feed quantity can be made either by weight or by volume. Detection by volume can, for instance, be made by means of a level indicator.

The movement of the container, between stop and release position, can be a vertical up and down going movement.

The stop device is, however, mainly mounted in a way that it can be swung round the conveyor tube, and for detection of the feed quantity it is balanced with a weight so that it can take up a sloping position compared to vertical.

When the feed begins to run down into the container the centre of gravity is shifted, so that it tends to go towards a vertical position till it reaches stop position where it activates the contact mechanism to stop the feed conveyance.

The balancing of the container is made by mounting at the end where it is suspended a lever projecting from the container and equipped with a sliding weight.

As the filling degree in the conveyor tube—as previously explained—is deminishing in the transport direction the feed quantity required to stop the transport of feed depends on the distance between the last feed dispenser and the stop device, and the balancing of the container can easily be adjusted accordingly by adjustment of the weight.

The stop device is mainly made so that the sloping position is between the stop and the discharge position, and the container is moved between these two positions over the sloping position and from the discharge position back the same way to the sloping position, whereby some room is saved as the movements of the container are made only on one side of the conveyor tube, which can therefore be placed close to a wall.

To make it easier to empty the container the stop device is made in a way that the container in discharge position is in a position vertical over the conveyor tube, so that the entire weight of the feed is used for the discharge.

To prevent the feed from forming a bridge over the outlet of the container it can be equipped with a pivotally suspended loosening unit, which goes into the container and is actuated by the conveying mechanism to a nodding movement when the container is in discharge position, which movement prevents the forming of a bridge.

The stop device is mainly constructed so that the conveyor tube is used as a bearing axis. This gives a simple construction and makes it possible to mount the container any place on the conveyor tube, which can easily be done with two cylindrical fittings.

E.g. the movements of the container can be made by a motor and a crank mechanism constructed so that the container will work on one side of the conveyor tube while the motor will rotate the other way.

This construction will make it possible for the container to work between its various positions, however, leaving a clearance in the crank unit so that the container can move freely from the sloping position to the discharge position.

The movement of the container can also take place by means of a cable or a pulling device, which can be connected with the activation of the feed dispensers, so that the container is placed in discharge position at the same time as the dispensing of the feed from the feed dispensers into the troughs takes place. In this case the simplest way for the container to return from the discharge position to the sloping position will be by means of its gravity.

The movements of the container are mainly geared so that the container after release of the feed dispensers is in its discharge position and is held there for some time after the start of the conveying mechanism, sufficiently for discharge of the container. Hereafter it is returned to the stop position respectively the sloping position.

The driving gear and the stearing of the movements of the container will be explained in detail in connection with the following two construction examples.

In the drawing is shown

FIG. 1 a perspective picture of one type of construction of a stop device, where the container is shown in the position in which it is placed when empty.

Figure 2:
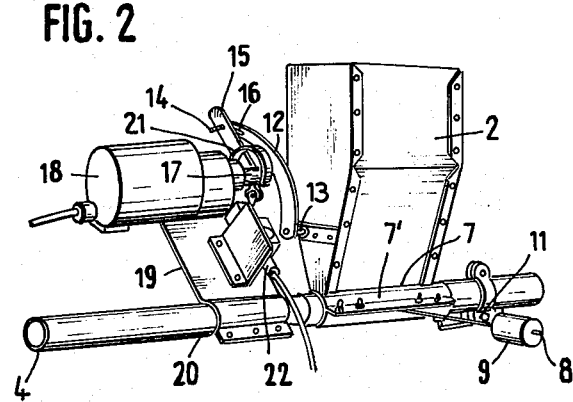

FIG. 2 a perspective picture of the same type of construction as FIG. 1, but showing the container in a position where the contents are returned to the conveyor tube.

FIG. 3 a perspective picture of another type of construction of the stop device where the container is activated in connection with automatic release of a feed quantity into a trough, and showing the container in its empty position at the beginning of the system.

FIG. 4 a perspective picture of the same type of construction as shown in FIG. 3, but showing the container in a position where the contents are returned to the conveyor tube.

Figure 5:
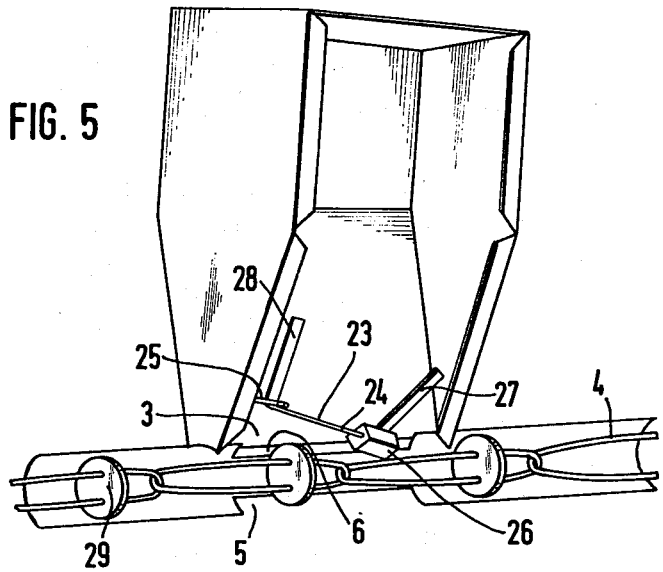

FIG. 5 a perspective picture of the container in discharge position and a length of the conveyor tube where to give a clear picture one side of the container has been removed and the conveyor tube intersected.

Figure 6:
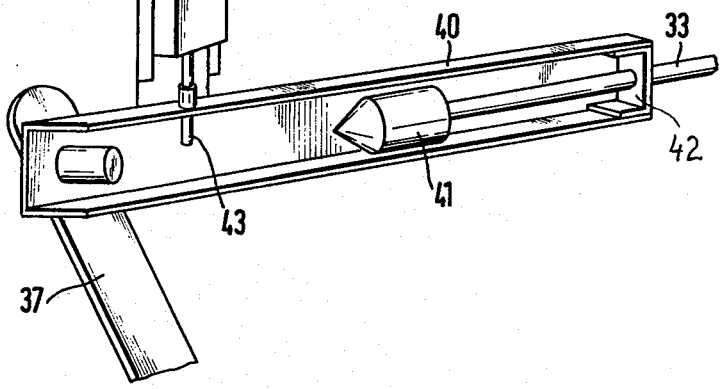

FIG. 6 a perspective picture of the tube and the pole of the other construction type, where one side of the tube has been removed in order to give a clear picture.

The stop device shown in FIG. 1 on the drawing includes a container 2 with inspection window 1. The container has a confined opening 3 in one end.

The confined opening 3 is thus constructed that the width of the opening 3 is smaller than the diameter of the conveyor tube 4, on which it shall be mounted.

On the place where the stop device is wanted a discharge slit 5 in the bottom of the conveyor tube 4 is made as well as a discharge slit 6 placed in diametrical opposition in the top of the conveyor tube 4.

Both slits have a length which does not exceed the length of the container. The container 2 is placed so that its opening 3 is opposite the two slits 5 and 6 in the conveyor tube 4, and the container 2 is pivotally mounted to the conveyor tube 4 by means of a two-piece cylindrical fitting 7.

In the cylindrical fitting 7 fastened to the container at its opening there has been made a slit corresponding to the opening 3 of the container.

The two cylindrical fittings 7 are assembled with a clearance round the conveyor tube 4 by means of bolts, whereby the container 2 can freely pivot round the conveyor tube 4.

Because of its weight the container will be at rest immediately under the conveyor tube 4.

The gravity of the container 4 can, however, be shifted if wanted, as the container 2 is connected with a lever 8 and a sliding weight mounted on the lever.

The lever 8 projecting vertically from the gravity axis of the container is fastened to a piece of flat bar which has been bolted with the cylindrical fittings 7 of the container.

The weight 9 is adjusted so that the gravity axis of the container 2 is forming an angle to vertical.

FIG. 1 shows the location of the container 2 relative to feed dispensers along the conveyor tube 4. The last two feed dispensers 50 and 51 in the feeding system are illustrated, these feed dispensers communicating with the interior of the conveyor tube 4, and the animal feed being conveyed within the conveyor tube 4 in the direction from the dispenser 50 to the dispenser 51. The container 2 is located downstream of the last feed dispenser 51.

When filling of the last feed dispenser in operation has started the container 2 will gradually become filled with feed so that on account of the moment increasing according to the weight of the feed the container 2 will be forced into a position immediately under the conveyor tube 4.

The container 2, which has a contact surface 10, which is out of action when the container is in its sloping position, will—when swinging towards the position immediately under the conveyor tube—actuate an electric switch 11, which stops the feeding system.

The switch 11 is mounted to the conveyor tube 4.

The container 2 is also equipped with a connecting rod 12, one end of which is pivotally connected with the container 2 by a dowel 13, whereas the opposite end is pivotally connected with one end of a crank 15 by another dowel 14.

The connecting rod 12 is made with a gliding slit 16 for the dowel 14 with a clearance so that the connecting rod 12 can glide round the dowel 14.

The gliding slit 16 has such a length that the container 2 can freely swing from the sloping position to the position under the conveyor tube 4.

One end of the crank 15 is connected with the dowel 14, whereas the opposite end is fastened to the driving shaft 17 from an electric motor 18.

The electric motor 18 is fastened to the conveyor tube 4 by a base plate 19, in which a dent corresponding to half the cross section of the conveyor tube is made, and the base plate 19 is fastened by mounting a cylindrical fitting 20 with bolts.

The crank 15 is in a distance from the motor's 18 driving shaft 17 provided with a half-circular contact pole 21, which can actuate an electric switch 22. By a two-way connection this switch 22 is connected with a time switch controlling the operations of the feeding system.

When the driving mechanism of the feeding system is wanted to operate the time switch will start the motor 18, which stops when the container 2 has reached its discharge position, as the switch 22 will change position because of the effect of the half-circular contact pole 21.

After a fixed period of time the time switch will switch back to its initial position. As a result of the two-way connection between the time switch and the switch 22 the motor 18 will start again and continue to work until the half-circular contact pole 21 brings the switch 22 to change its position and hereby stops the motor 18 in the position where the container 2 is lowered into its initial position.

The time interval at the time switch is set so that all feed in the container 2 is given time to return to the conveyor tube 4, and the container 2 can return empty to its initial position.

In order to prevent the feed in the container 2 from forming a bridge in the discharge position so that it can not recirculate in the conveyor tube 4 the container is equipped with a loosening unit 23.

The loosening unit 23 shown in FIG. 5, comprises a lever 24 fastened pivotally to the walls of the container by an axle 25.

The other end of the lever 24 is provided with a unit 26, which is mounted so that some part of it goes down in the slit 6 in top of the conveyor tube 4 in the container's 2 discharge position.

In order to increase the loosening effect the unit 26 has been provided with a little pole 27 and another pole 28 has been mounted at the axle 25 of the lever 24.

The unit 26 projects so far into the cavity of the conveyor tube 4 that it is actuated by the conveying mechanism 29.

The loosening unit 23 is thus actuated to a nodding movement, which effectively prevents the feed from forming a bridge.

On the drawings FIGS. 3 and 4 is shown how to construct the stop device in another way according to the invention.

This stop device only differs from the above described in the way in which the container is swung into the discharge position over the conveyor tube 4. The stop device consists of a container 2, a lever 8, a loosening unit 23, a switch 11, all of which, together with their functions, are described in connection with the above described construction type.

The present construction type consists of a cable 30 one end of which is fastened to the container 2 by means of an eye 31.

The other end of the cable 30 is led round a roller 32 and fastened to a pole 33 by means of a cable tightener 34.

The roller 32 is fastened to the conveyor tube 4 by a support 32', which is fastened with a clamp 35.

The plan of the roll 32 and consequently also the support 32' are given such a slope compared to vertical that, when the cable 30 is tightened, the container 2 can move from its position under the conveyor tube 4 to a position over the conveyor tube 4 where the feed quantity in the container 2 automatically runs back in the conveyor tube 4.

In the present embodiment of the invention the contents of the container 2 is led back into the conveyor tube 4 in connection with discharge of the dispensed feed quantity into the troughs, and the feed dispensers are constructed so that the same activating pole 36 will activate the closing mechanisms in all of them.

The mentioned activating lever 36 has two extreme positions, one by closed feed dispenser and another by open feed dispenser.

To the activating lever 36 is pivotally mounted a lever arm 37, one end of which is pivotally mounted e.g. to the conveyor tube 4 by means of a T-shaped fitting 38 fastened with clamps 39.

The other end of the lever arm 37 is pivotally fastened to the tube 40.

The pole 33 to which the cable 30 is fastened can slide in the tube 40.

At the other end of the pole 33, which glides into the tube 40, a stop 41—see FIG. 6—is mounted, and the tube 40 has in the end nearest the container 2 a narrowing 42, so that the stop 41 remains in the tube. In a distance from the narrowing 42 of the tube 40 there is a hole, through which is placed a piston 43, which can be pulled in and out the tube 40 by means of a electro magnet 44 mounted on the tube 40.

The stop device works so that the cable 30 has an extra length that allows it to hang slackly in order to enable the container 2 to swing freely from a non-active position to stop position, where it actuates the stop relay 11. Hereby the driving unit for the feeding system is stopped.

When the contents of the feed dispensers are released in activating pole 36 is pushed forward as shown by the indicator P.

On account of the movements of the lever arm 37 the tube 40 is now pushed in over the pole 33 and the stop is pushed past the piston 43 because the end of the stop 41 that turns towards the piston 43 is pointed in such a way that the piston is pushed up over the stop 41, when it is passed.

The feed boxes will now be closed by withdrawal of the activating pole 36 to its initial position.

The stop by the pole 33 now grasps the piston 43 and is pulled back in the same direction as the activating pole 36.

The cable 30 will now tighten and pull the container 2 up in discharge position. When the feeding system is set to work again a time switch connected with a relay starts, so that the electro magnet 44, after a fixed period of time, is actuated to pull out the piston 43 of the interior of the tube 40, after which the container 2 can swing freely back to its initial position.

The time interval has such a length that there is time enough for the contents of the container 2 to be discharged into the conveyor tube 4.

The time interval is usually 16 minutes.

To prevent the stop 41 in the tube 40 from knocking against the narrowing 42 the pole 33 has a stop 45 which knocks against a stop 46 mounted to the conveyor tube 4 with a clamp 47.

The stop 46 also serves as a steering mechanism for the pole 33 and prevents the pole 33 from bending when its stop 41 is pushed past the piston.

I claim:

1. A stop device for use in automatic animal feeding systems which include a series of successive feed dispensers communicating with a common conveyor conduit, means for transporting animal feed through said conduit for successive distribution to each of said feed dispensers, and drive means for driving said transporting means within said conveyor conduit at timed intervals.

said stop device comprising a container operatively associated with said conveyor conduit and positioned downstream of the last feed dispenser for detecting the completion of the distribution of a selected amount of feed to said feed dispensers, means mounting said container for movement between an inactive position, a stop position, and a discharge position, said container, in said inactive position, communicating with the interior of said conveyor conduit and being positioned to receive feed gradually from said conveyor as said feed is moved by said transporting means, said container being adapted to move from said inactive position to said stop position in response to the accumulation of a selected quantity of feed therein, switch means operatively connected to said drive means for deenergization thereof upon actuation of said switch means, said switch means being positioned to be engaged and actuated by said container when the latter moves to its stop position, and power driven means coupled to said container for moving the latter from said stop position to said discharge position in which said accumulated feed is emptied from said container.

2. A stop device according to claim 1 in which said conveyor conduit is a conveyor tube, and in which said container is mounted on said conveyor tube for swinging movement thereon between its inactive postion, stop position and discharge position, said container mounting a weight positioned to maintain said container in an inclined condition at an angle to the vertical, in the inactive position thereof.

3. A stop device according to claim 2 in which said container has a lever projecting therefrom with said weight adjustably slidable on said lever for selectively varying the inclination of said container in its inactive position.

4. A stop device according to claim 2 in which said stoping, inactive position is located between said stop position and said discharge position, said container being movable by said power driven means from said stop position to said discharge position, being then movable, after a selected time period from said discharge position to said inclined, inactive position, and being movable by gravity, under the weight of the accumulated feed in said container, from said inactive position to said stop position.

5. A stop device according to claim 4 in which said power driven means includes a driving gear assembly comprising a motor having a drive shaft, a crank secured to the drive shaft of said motor, a connecting rod pivotally connected at one end to said crank and pivotally connected at its other end to said container.

6. A stop device according to claim 5 in which said power driven means also includes a semi-circular contact arm secured to said crank for rotation therewith, and a second switch immovably mounted on said conveyor tube and electrically connected to said motor, said contact arm being positioned to engage and actuate said switch when said container is moved from its stop position to its discharge position, to stop said motor when said container reaches said discharge position.

7. A stop device according to claim 4 in which said power driven means includes a lever pivotally mounted on said conveyor tube, a drive member connected to said lever for moving the latter about its pivotal mount, a tube mounted on said lever for movement therewith, a rod slidably mounted within said tube, a stop member mounted upon the end of said rod within said tube, a cable connecting the other end of said rod to said container, an electro-magnet mounted exteriorly of said tube, and a piston associated with said electro-magnet for axial movement in response to energization of said electro-magnet, said piston projecting into the interior of said tube and being movable by said electro-magnet between a first position in which said it engages said stop member, and a second position in which it is clear of said stop member.

8. A stop device according to claim 7 in which said drive member is movable to a first position in which said drive member is movable to a first position in which it turns said lever, said connected tube, and said rod coupled to said tube by engagement of said piston with said stop member, in a direction to tighten said cable and move said container from said stop position to said discharge position, said power driven means also including timing means and relay means for actuating said electro-magnet after a selected time period to move said piston to its second position in which it releases said rod and permits said container to swing back to its inactive position.

9. A stop device according to claim 2 in which said container in said discharge position is vertically upstanding from said conveyor tube and is in communication with said conveyor tube for the discharge of feed into said conveyor tube.

10. A stop device according to claim 9 in which said container has an aperture communicating with said conveyor tube for the passage of feed therethrough, and in which said stop device also includes loosening means for preventing the formation of a feed blockage in said aperture, said loosening means being mounted within said container and having a portion projecting from said container and positioned to be engaged by said drive means for intermittent actuation when said drive means is operated with said container in said discharge position.

11. A stop device according to claim 10 in which said loosening means includes a rod pivotally mounted within said container, an actuating member mounted on said rod and projecting through the container aperture into the interior of said conveyor tube into the path of said drive means, and at least one loosening arm connected to and movable by said actuating member and said rod.

12. A stop device according to claim 2 which includes mounting means for pivotally suspending said container from said conveyor tube with the latter serving as a bearing axis for pivotal movement of said container thereabout.

13. A stop device according to claim 12 in which said mounting means includes a pair of cylindrical fittings, and in which said container has an aperture at its mounted end communicating with the interior of said conveyor tube, one of said cylindrical fittings being secured to said container in a position overlying said aperture and having an opening registering with said aperture.

14. A stop device according to claim 1 in which said power driven means includes timing means for moving said container from said stop position to said discharge position in response to restarting of said drive means, for retaining said container in said discharge position while said drive means is operating for a sufficient period of time to enable said container to fully discharge the accumulated feed therein, and for thereafter moving said container to its inactive position.

* * * * *